United States Patent
Rothman et al.

(10) Patent No.: US 7,370,188 B2
(45) Date of Patent: May 6, 2008

(54) INPUT/OUTPUT SCANNING

(75) Inventors: Michael A. Rothman, Puyallup, WA (US); Vincent J. Zimmer, Federal Way, WA (US)

(73) Assignee: Intel Corporation, Armonk, NY (US)

( * ) Notice: Subject to any disclaimer, the term of this patent is extended or adjusted under 35 U.S.C. 154(b) by 366 days.

(21) Appl. No.: 10/848,021

(22) Filed: May 17, 2004

(65) Prior Publication Data

US 2005/0268079 A1 Dec. 1, 2005

(51) Int. Cl.
*G06F 9/00* (2006.01)
*G06F 15/177* (2006.01)

(52) U.S. Cl. .............. 713/2; 713/1; 713/100; 713/188; 726/22; 726/23; 726/24; 726/25

(58) Field of Classification Search ............ 713/1–194; 726/22–25
See application file for complete search history.

(56) References Cited

U.S. PATENT DOCUMENTS

| | | | | |
|---|---|---|---|---|
| 5,475,839 | A | * | 12/1995 | Watson et al. .................. 713/2 |
| 5,802,277 | A | * | 9/1998 | Cowlard ....................... 726/22 |
| 5,948,104 | A | * | 9/1999 | Gluck et al. .................. 726/24 |
| 6,035,423 | A | * | 3/2000 | Hodges et al. ................. 714/38 |
| 6,564,318 | B1 | * | 5/2003 | Gharda et al. .................. 713/2 |
| 6,728,886 | B1 | * | 4/2004 | Ji et al. ......................... 726/24 |
| 6,748,534 | B1 | * | 6/2004 | Gryaznov et al. .......... 713/188 |
| 2003/0110391 | A1 | * | 6/2003 | Wolff et al. ................. 713/200 |
| 2003/0131248 | A1 | * | 7/2003 | Huang ........................ 713/188 |
| 2004/0117401 | A1 | * | 6/2004 | Miyata et al. ............ 707/104.1 |
| 2004/0236960 | A1 | * | 11/2004 | Zimmer et al. ............. 713/200 |
| 2005/0216759 | A1 | * | 9/2005 | Rothman et al. ........... 713/200 |

OTHER PUBLICATIONS

Doran, M. "EFI 1.10 and Beyond: An Overview", Intel Corporation, Feb. 19, 2003, pp. 1-28.
Doran, M., "Extensible Firmware Interface: Changing the Face of BIOS", Intel Corporation, Aug. 28-30, 2001, pp. 1-24.
Ferrie, P., "Symantec Security Response- W32.HLLW.Winevar", (online), Nov. 26, 2002, [Retrieved on Mar. 26, 2004], retrieved from the Internet at <URL: http://securityresponse.symantec.com/avcenter/venc/data/pf/w32.htlw.winevar.html>.
Ham, M., "Tutorial: Removing Boot Sector Viruses", (online), Mar. 20, 2002, [retrieved on Mar. 26, 2004], retrieved from the internet at <URL: http://www.virushtm.com/support/tutorials/boot.xml>.
Intel Corporation, "Extensible Firmware Interface Specification", Version 1.10, Dec. 1, 2002, Chapters 1-10, 360 pgs.

(Continued)

*Primary Examiner*—Rehana Perveen
*Assistant Examiner*—James F. Sugent
(74) *Attorney, Agent, or Firm*—Konrad Raynes & Victor LLP; David W. Victor (57) ABSTRACT

Provided is a technique for Input/Output scanning. A storage controller receives I/O requests from a host system, having an operating system, directed to at least one storage unit, wherein the storage controller manages I/O access to the at least one storage unit. A scanner program is loaded before executing any I/O requests directed to the at least one storage unit and the scanner program is run to check for code identified in code definitions in I/O requests directed to the at least one storage unit before and after the host operating system is loaded.

25 Claims, 5 Drawing Sheets

OTHER PUBLICATIONS

Intel Corporation, "Extensible Firmware Interface Specification", Version 1.10, Dec. 1, 2002, Chapters 11-15, 354 pgs.

Intel Corporation, "Extensible Firmware Interface Specification", Version 1.10, Dec. 1, 2002, Chapters 16-index, 370 pgs.

Intel Corporation, "Extensible Firmware Interface Specification-Specification Update", Version 1.10, Nov. 26, 2003, pp. 1-63.

Wing, S., "Why Anti-Virus Scanners are Not Enough", (online), 1999, [retrieved on Mar. 26, 2004], retrieved from the Internet at <URL: http://www.itsecurity.com/papers/swing.htm>.

"PCI Local Bus Specification", Rev. 2.3, Mar. 2002, pp. 1-328.

"SCSI Architecture Model—3 (SAM 3)", ANSI, T10, Project 1561-D, Mar. 2004, pp. 1-132.

"Serial ATA: High Speed Serialized AT Attachment", Rev. 1.0a, Jan. 2003, pp. 1-311.

* cited by examiner

INPUT/OUTPUT SCANNING

BACKGROUND

Many desktop computers and network systems run anti-virus programs to prevent users from inadvertently invoking malicious code, such as a virus, worm, Trojan horse, adware, spyware, etc. Many of these anti-virus programs are loaded into the runtime environment after the operating system is loaded. Such anti-virus programs cannot detect and stop the execution of virus data in the boot sector of the primary hard disk drive that is executed before the operating system and anti-virus program are installed. For such boot sector viruses, by the time the anti-virus program is loaded and running, the virus may have spread throughout the system and to any attached storage devices or over any attached network devices.

To remove malicious code from the boot sector, the user may boot the system from a floppy disk or other boot device and run an anti-viral program from the boot disk to scan and remove any viruses from the boot sector. Further, some products provide a facility to encrypt and prevent modification to the system areas, such as the boot sector, of the hard disk drive to allow detection of changes to the boot sector and system areas of the hard disk.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
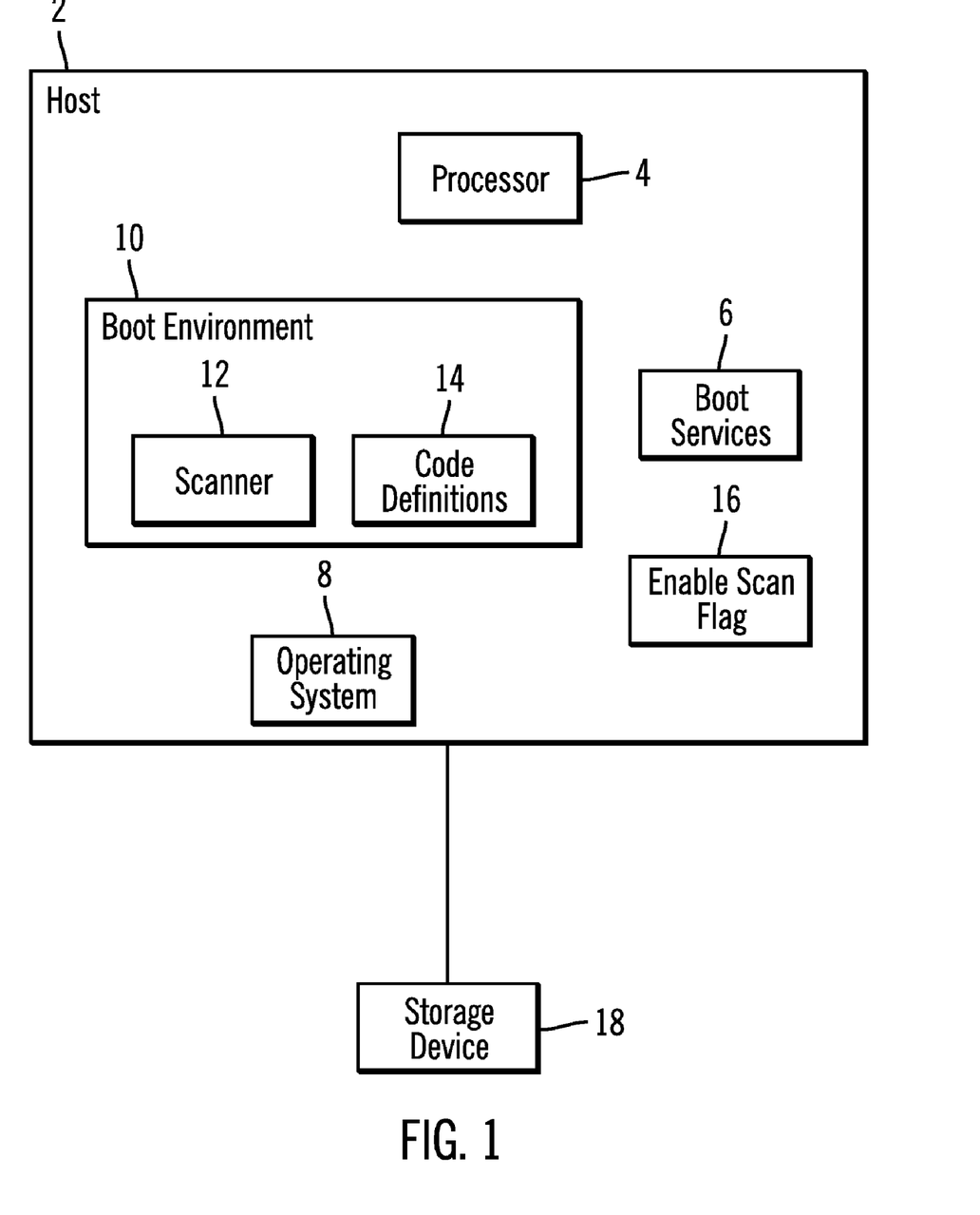
FIGS. 1, 3 and 5 illustrate computing environments.

FIG. 1 illustrates a computing environment used with the described embodiments. A host system 2 includes a processor 4 and boot services 6 which loads an operating system 8 and other essential programs needed for the host system 2 to run, such as device drivers, into a boot environment 10. Before loading the operating system 8 into the boot environment 10, the boot services 6 may load a scanner 12 into the boot environment 10 to check for code identified in a code definitions 14 file. Code identified in the code definitions file 14 may comprise viruses, worms, adware, spyware, Trojan horses, bots, remote control or any other code that is subject to detection in order to prevent its execution. An enable scanner flag 16, which may be set by the user, indicates to the boot services 6 whether to load the scanner 12 into the boot environment. The boot services 6 may be implemented in firmware in a Basic Input Output System (BIOS) device. The scanner 12, code definitions 14, and enable scanner flag 16 may be implemented in the boot services 6 firmware, such as within a Flash memory device or BIOS device. Alternatively, boot services 6 may load the scanner 12, code definitions 14, and/or enable scanner flag 16 from a storage device 18, which may comprise the primary system storage of the host system 2. The operating system 8 is loaded into the boot environment 10 from the storage device 18. In certain embodiments, the boot services 6 may implement the Extensible Firmware Interface (EFI) specification, which defines an interface between the operating system 8 and the boot services 6 firmware. The EFI interface provides data tables that contain platform-related information, boot and runtime service calls that are available to the boot services 6 operating system 8 loader, and a standard environment for booting the operating system 8. EFI is further defined in the publication "Extensible Firmware Interface Specification", Version 1.10 (Copyright Intel Corp., 1998-2002).

The operating system 8 may comprise an operating system known in the art, such as a Microsoft® Windows® operating system, Linux, etc. (Microsoft and Windows are registered trademarks of Microsoft Corporation and Linux is a trademark of Linus Torvalds). The storage device 18 may comprise a hard disk drive or other device from which system files may be loaded.

Figure 2:
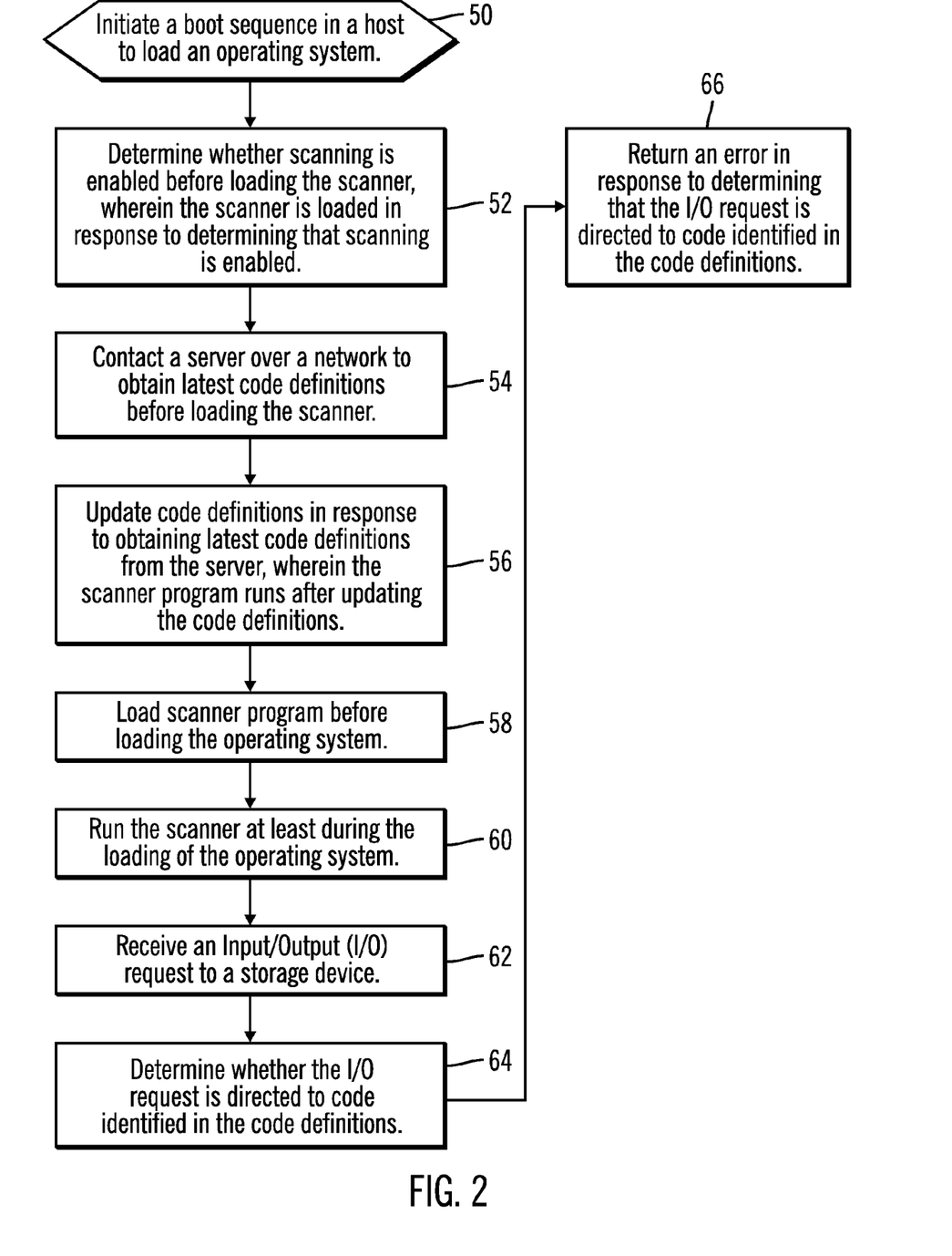
FIGS. 2 and 4 illustration operations to scan for code identified in code definitions.

FIG. 2 illustrates operations performed by the boot services 6 and the scanner 12. The boot services 6 initiates (at block 50) a boot sequence in the host 2 to load an operating system 8 from the storage device 18 into the boot environment 10. The boot services 6 determines (at block 52) whether scanning is enabled before loading the scanner 12, wherein the scanner 12 is loaded in response to determining that scanning is enabled. The enable scan flag 16 may be used to indicate whether scanning is enabled. If the scanner is enabled, then control proceeds to operations 54-66, otherwise, the operating system 8 is loaded into the boot environment 10 without the scanner 12.

If scanning is enabled, then the boot services 6 contacts (at block 54) a server over a network (not shown) to obtain the latest code definitions. In such case, the boot services 6 loads the network services to allow communication with the server over the network. The code definitions 14 are updated (at block 56) in response to obtaining latest code definitions from the server. In alternative embodiments, the most recent updates may be loaded by a user from an attached storage medium coupled to the host 100, such as a CD-ROM, etc. In certain embodiments, the code definitions 14 may be updated before the scanner 12 operates to detect code identified in the code definitions so that the most recent code definitions 118 are used or while the scanner is detecting code identified in the code definitions. The boot services 6 loads (at block 58) the scanner 12 before loading the operating system 8 and runs (at block 60) the scanner 12 at least during the loading of the operating system. In certain embodiments, the scanner 12 loaded by the boot services 6 may continue to run after the operating system is loaded as the system program for detecting malicious code, e.g., anti-virus program. Alternatively, the scanner 12 loaded by the boot services 6 may terminate after the operating system 8 loads and starts running other malicious code detectors.

During the loading of the operating system 8 and/or after the operating system 8 is loaded, an Input/Output (I/O) request is received at the processor 4 that is directed (at block 62) to the storage device 18. The scanner 12 determines (at block 64) whether the I/O request is directed to code identified in the code definitions 14 and returns (at block 66) an error in response to determining that the I/O request is directed to identified code. If identified code is not detected, the I/O request is allowed to proceed. As discussed, the detected code identified in the code definitions may comprise malicious code, such as viruses, worms, Trojan horses, adware, spyware, bots, remote control etc. or any other designated code to be detected to prevent its execution.

Figure 3:
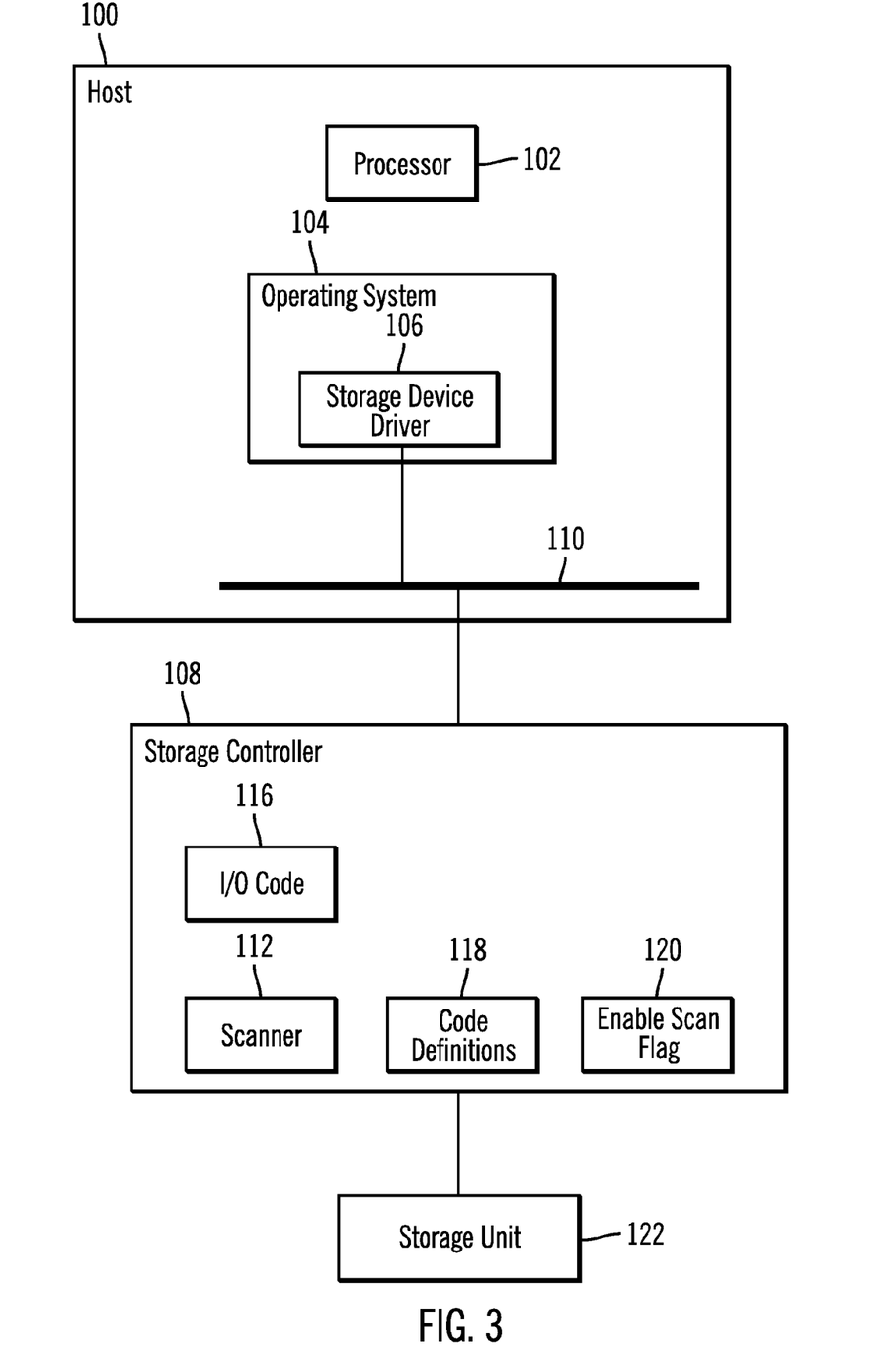

FIG. 3 illustrates an additional computing environment embodiment. A host system 100 includes a processor 102 which executes an operating system 104 and a storage device driver 106. The device driver 106 provides an interface between the operating system 104 and a storage controller 108 over a bus interface 110.

The storage controller 108 manages the storage and access of data in the storage unit 122, which may comprise a hard disk drive or other non-volatile storage device known in the art. In certain embodiments, the bus interface 110 may comprise a bus interface, such as a Peripheral Component Interconnect (PCI) interface, Small Computer System Interface (SCSI), Serial Attached SCSI (SAS), and other bus interfaces known in the art. PCI is described in the publication "PCI Local Bus Specification", Rev. 2.3 (March 2002), published by the PCI Special Interest Group; SCSI is described in the publication; SCSI is described in the publication "SCSI Architecture Model—3 (SAM 3)", published by ANSI, T10, Project 1561-D (March 2004); and SATA is described in the publication "Serial ATA: High Speed Serialized AT Attachment", Rev. 1.0a (January 2003). Alternatively, the interface 110 may comprise a network connection to connect over a network, such as a Local Area Network (LAN), Wide Area Network (WAN), Storage Area Network (SAN), etc.

The storage controller 108 includes I/O code 116 to manage I/O requests to one or more storage units 122 (only one is shown). The storage controller 108 firmware further includes scanner 112 code to check for any code identified in code definitions 118 and an enable scanner flag 120, which may be set by the user, and indicates to the storage controller 108 whether to run the scanner 112 when the storage controller 108 initializes.

The storage unit 122 may include a magnetic storage media, such as the case if the storage unit 122 comprises a hard disk drive, tape drive, etc. In the embodiment of FIG. 3, the storage controller 108 is shown located external to the storage units 122. For instance, the storage controller 108 may comprise firmware implemented in an integrated circuit coupled to the motherboard of the host system 100 or in an expansion card in an expansion slot of the host system 100. The storage controller 108 may manage a plurality of storage units 122, such as disk drives, as a single storage entity, where the storage controller manages the devices as a Redundant Array of Independent Disks (RAID) array, Just a Bunch of Disks (JBOD), Direct Access Storage Device (DASD), etc. Alternatively, the storage controller 108 may be implemented within the housing of the storage unit 122, such as an on-board drive disk controller.

Figure 4:
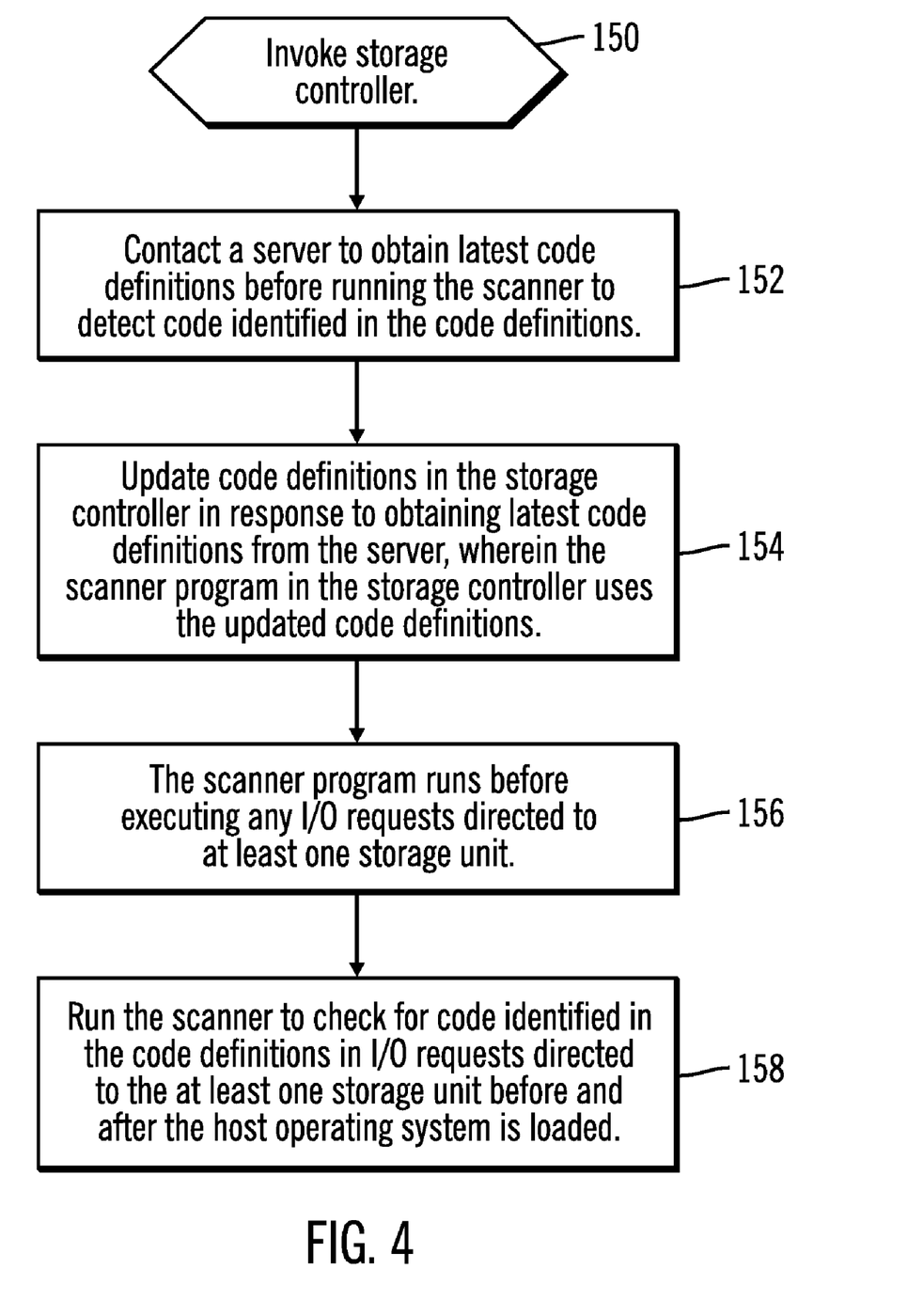

FIG. 4 illustrates operations performed by the storage controller 108 and scanner 112. Upon initialization (at block 150), the storage controller 108 invokes the scanner 112 to contact (at block 152) a server to obtain the latest code definitions 118. The code definitions 118 are updated (at block 154) in the storage controller 108 in response to obtaining latest code definitions from the server. In certain embodiments, the code definitions 118 may be updated before the scanner 112 operates to detect code so that the most recent code definitions 118 are used or while the scanner 112 is detecting code. The server may be contacted by the scanner 112 logic implemented within the storage controller 108. Alternatively, the storage device driver 106 may contact a server over a network to access the most recent code definitions and then update the storage controller 108 firmware with the accessed most recent code definitions. Still further, the most recent code definitions may be loaded by a user from an attached storage medium, such as a CD-ROM.

The scanner 112 runs (at block 156) before executing any I/O requests directed to the at least one storage unit 122. The scanner 112 runs (at block 158) to check for code identified in the code definitions 118 data in all I/O requests directed to the at least one storage unit 122 before and after the host operating system 100 is loaded.

Figure 5:
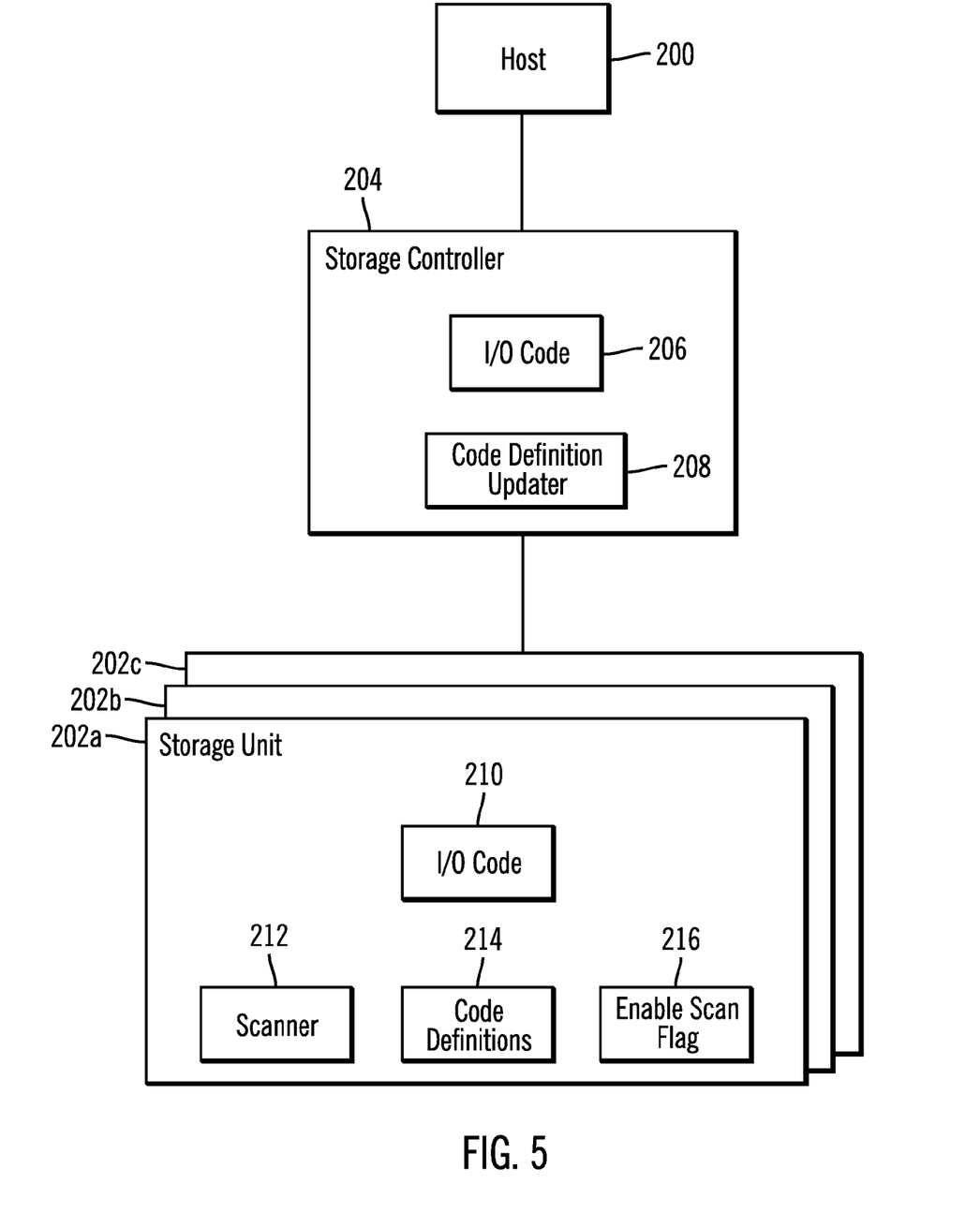

FIG. 5 illustrates an additional computing environment embodiment. A host 200 communicates I/O requests to multiple storage units 202a, 202b, 202c via a storage controller 204. The storage controller 204 may be implemented within the housing of the host 200 or in an external system. The storage controller 204 includes I/O code 206 to manage I/O requests from the one or more hosts 200 (only one is shown) and a code definitions updater 208. The code definitions updater 208 is capable of accessing most recent code definitions from a server over a network (not shown) or from an attached storage medium. The storage controller 204 manages access to the storage units 202a, 202b, 202c, where each storage unit includes I/O code 210 to manage I/O requests to a storage medium within the storage unit 202a, 202b, 202c, a scanner 212, code definitions 214, and an enable scan flag 216. The I/O code 210 may manage the storage units 202a, 202b, 202c as interconnected units, such as a RAID array, JBOD, etc. If the enable scan flag 216 for a storage unit 202a, 202b, 202c is enabled, then during initialization, the scanner 212 for each enabled storage unit 202a, 202b, 202c is invoked to detect any data identified in the code definitions subject to I/O requests directed to the storage medium within the storage unit 202a, 202b, 202c. In certain embodiments, the code definition updater 208 in the master storage controller 204 applies the most recent code definitions downloaded from over a network to each storage unit 202a, 202b, 202c to update the code definitions 214 in each unit.

With the embodiments of FIGS. 3, 4, and 5, the scanner operations are offloaded from the host to a storage controller hardware to filter any I/O requests directed to the storage unit managed by the storage controller. With these embodiments, the scanner invoked when the storage controller initializes detects code identified in the code definitions, such as malicious code, being accessed during the host boot sequence before the operating system is invoked and after the operating system is mounted because the detection operations are performed at the point of access to the storage medium.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, upon detecting code identified in the code definitions, such as malicious code, the execution of the I/O request directed toward the detected code is halted and an error may be thrown. In alternative embodiments, upon detecting code identified in the code definitions, the I/O request toward the detected code may be allowed to proceed and information on the detection may be logged.

In certain embodiments, the scanner program may be implemented in systems having a boot device, such as the BIOS, where the scanner program is invoked from the boot device during the boot sequence to load the operating system. In alternative systems, the boot sequence may load the scanner program from attached storage to execute during the boot sequence.

In certain systems, the scanner program may be implemented in a storage controller managing access to a plurality of attached storage units, such as disk drives, to detect code identified in the code definitions in I/O requests directed to the storage units. In alternative embodiments, the scanner program may be implemented in a controller within the storage unit housing the storage medium, such as the case with a disk drive controller within a hard disk drive unit.

The illustrated operations of FIG. 2 and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    initiating a boot sequence in a host to load an operating system;
    determining whether scanning is enabled during the boot sequence;
    loading a scanner program before loading the operating system in response to determining that scanning is enabled; and
    running the scanner program at least during the loading of the operating system to detect code identified in code definitions by:
        receiving an Input/Output (I/O) request to a storage device during the loading of the operating system;
        determining whether the I/O request is directed to code identified in the code definitions; and
        returning an error in response to determining that the I/O request is directed to code identified in the code definitions.

2. The method of claim 1, further comprising:
    contacting a server over a network to obtain a latest code definitions; and
    updating the code definitions in response to obtaining the latest code definitions from the server.

3. The method of claim 1, wherein loading the scanner program comprises:
    issuing a call from the boot program to load the scanner program from storage.

4. The method of claim 1, wherein the boot sequence is initiated within a storage controller managing access to at least one storage unit.

5. The method of claim 1, wherein the boot sequence is initiated within a host system transmitting I/O requests to a storage device in communication with the host system.

6. A method implemented in a storage controller receiving I/O requests from a host system, having an operating system, directed to at least one storage unit, wherein the storage controller manages I/O access to the at least one storage unit, comprising:
    loading a scanner program before executing any I/O requests directed to the at least one storage unit; and
    running the scanner program to check for code identified in code definitions in I/O requests directed to the at least one storage unit before and after the host operating system is loaded, wherein running the scanner program comprises:
        receiving an Input/Output (I/O) request to a storage device during the loading of the operating system;
        determining whether the I/O request is directed to code identified in the code definitions; and
        returning an error in response to determining that the I/O request is directed to code identified in the code definitions.

7. The method of claim 6, further comprising:
    contacting a server to obtain latest code definitions; and
    updating the code definitions in response to obtaining the latest code definitions from the server.

8. The method of claim 6, wherein the storage controller is implemented in one storage unit, wherein a device driver executing in the host system interfaces between the host system and the storage unit, wherein the device driver performs:
    contacting a server to obtain a latest code definitions before loading the scanner program; and
    updating code definitions in the storage controller in response to obtaining the latest code definitions from the server, wherein the scanner program in the storage controller uses the updated code definitions.

9. The method of claim 6, wherein a plurality of storage units include one storage controller that loads the scanner program, wherein a master storage controller coordinates I/O access to the storage units, wherein the master storage controller performs:
    contacting a server to obtain latest code definitions; and
    updating the code definitions in the storage units having the storage controller that loads the scanner program in response to obtaining the latest code definitions from the server, wherein the scanner program in the storage controller uses the updated code definitions.

10. A system, comprising:
a processor;
memory;
a storage device including a scanner program and an operating system, wherein the processor executes the operating system loaded into the memory; and
circuitry enabled to:
   initiate a boot sequence in a host to load the operating system into the memory;
   determine whether scanning is enabled during the boot sequence;
   load the scanner program from the storage device before loading the operating system in response to determining that scanning is enabled; and
   run the scanner program at least during the loading of the operating system to detect code identified in code definitions by
      receiving an Input/Output (I/O) request to the storage device during the loading of the operating system;
      determining whether the I/O request is directed to code identified in the code definitions; and
      returning an error in response to determining that the I/O request is directed to code identified in the code definitions.

11. The system of claim 10, wherein the system is in communication with a server, and wherein the circuitry is further enabled to:
   contact the server to obtain a latest code definitions; and
   update the code definitions in response to obtaining the latest code definitions from the server.

12. A storage controller capable of receiving I/O requests from a host system, having an operating system, directed to at least one storage unit, wherein the storage controller manages I/O access to the at least one storage unit, comprising:
circuitry enabled to:
   load a scanner program before executing any I/O requests directed to the storage medium; and
   run the scanner program to check for code identified in code definitions in I/O requests directed to the at least one storage unit before and after the host operating system is loaded by performing:
      receiving an Input/Output (I/O) request to the storage device during the loading of the operating system;
      determining whether the I/O request is directed to code identified in the code definitions; and
      returning an error in response to determining that the I/O request is directed to code identified in the code definitions.

13. The storage controller of claim 12, wherein the storage controller is in communication with a server, wherein the circuitry is further enabled to:
   contact the server to obtain latest code definitions; and
   update the code definitions in response to obtaining the latest code definitions from the server.

14. The storage controller of claim 12, wherein the storage controller is implemented in the storage unit having a storage medium.

15. The storage controller of claim 12, wherein the storage controller is in communication with a plurality of storage units and manages access to the storage units.

16. A system comprising:
a processor;
an operating system executed by the processor; and
a storage device, including:
   a storage medium;
   circuitry enabled to:
      receive I/O requests from the operating system directed to the storage medium;
      load a scanner program before executing any I/O requests directed to the storage medium; and
      run the scanner program to check for code identified in code definitions in I/O requests directed to the storage medium before and after the operating system is loaded by performing:
         receiving an Input/Output (I/O) request to the storage device during the loading of the operating system;
         determining whether the I/O request is directed to code identified in the code definitions; and
         returning an error in response to determining that the I/O request is directed to code identified in the code definitions.

17. The system of claim 16, wherein the system is in communication with a server, further comprising:
   circuitry enabled to contact the server to obtain latest code definitions; and
   circuitry enabled to update the code definitions in response to obtaining the latest code definitions from the server.

18. An article of manufacture comprising at least one of a hardware device having hardware logic and a computer readable storage medium having executable code to communicate with a host having an operating system and cause operations to be performed, the operations comprising:
   initiate a boot sequence in the host to load the operating system;
   determine whether scanning is enabled during the boot sequence;
   load a scanner program before loading the operating system in response to determining that scanning is enabled; and
   run the scanner program at least during the loading of the operating system to detect code identified in code definitions by performing:
      receiving an Input/Output (I/O) request to a storage device during the loading of the operating system;
      determining whether the I/O request is directed to code identified in the code definitions; and
      returning an error in response to determining that the I/O request is directed to code identified in the code definitions.

19. The article of manufacture of claim 18, wherein the host is in communication with a server, and wherein the article of manufacture is further enabled to:
   contact the server to obtain a latest code definitions; and
   update the code definitions in response to obtaining the latest code definitions from the server.

20. The article of manufacture of claim 18, wherein loading the scanner program comprises:
   issuing a call from the boot program to load the scanner program from storage.

21. The article of manufacture of claim 18, wherein the boot sequence is initiated within a storage controller managing access to at least one storage unit.

22. The article of manufacture of claim 18, wherein the boot sequence is initiated within a host system transmitting I/O requests to a storage device in communication with the host system.

23. An article of manufacture comprising at least one of a hardware device having hardware logic and a computer readable storage medium having executable code in a storage controller capable of receiving I/O requests from a host system having an operating system, directed to at least one storage unit, and cause operations comprising:

load a scanner program before executing any I/O requests directed to the at least one storage unit; and     run the scanner program to check for code identified in code definitions in I/O requests directed to the at least one storage unit before and after the host operating system is loaded by performing:

receiving an Input/Output (I/O) request to a storage device during the loading of the operating system;

determining whether the I/O request is directed to code identified in the code definitions; and         returning an error in response to determining that the I/O request is directed to code identified in the code definitions.

24. The article of manufacture of claim 23, wherein the article of manufacture is in communication with a server and further enabled to:

contact a server to obtain latest code definitions; and update the code definitions in response to obtaining the latest code definitions from the server.

25. The article of manufacture of claim 23, wherein the article of manufacture is implemented in one storage unit, wherein a device driver executing in the host system interfaces between the host system and the storage unit, wherein the device driver is enabled to:

contact a server to obtain a latest code definitions before loading the scanner program; and     update code definitions in the storage controller in response to obtaining the latest code definitions from the server, wherein the scanner program in the storage controller uses the updated code definitions.

\* \* \* \* \*